April 3, 1962
L. L. THOMPSON ETAL
3,028,181
SEALS FOR ROTATING SHAFTS
Filed Dec. 26, 1958
2 Sheets-Sheet 1
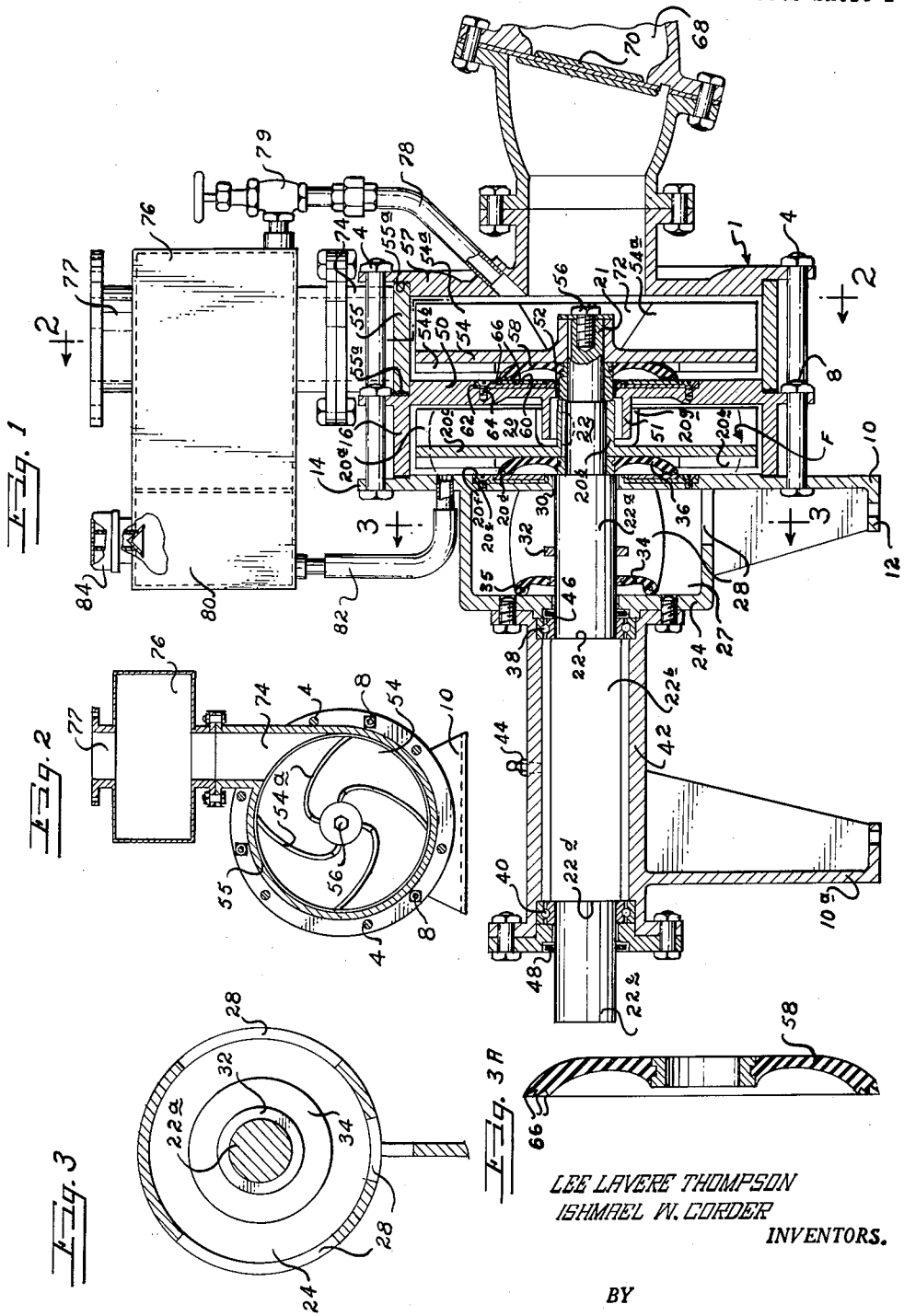
LEE LAVERE THOMPSON
ISHMAEL W. CORDER
INVENTORS.
BY
*Wayland D. Keith*
THEIR AGENT April 3, 1962
L. L. THOMPSON ETAL
3,028,181
SEALS FOR ROTATING SHAFTS
Filed Dec. 26, 1958
2 Sheets-Sheet 2
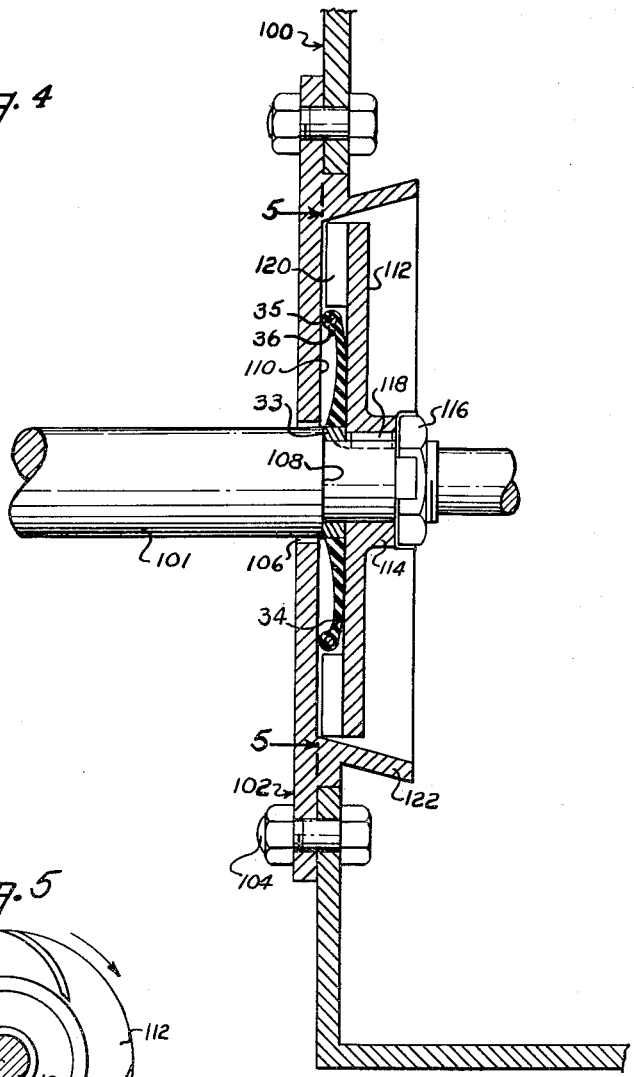
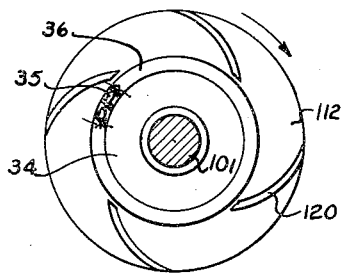
Lee Lavere Thompson
Ishmael W. Corder
INVENTORS
BY
Wayland D. Keith
THEIR AGENT United States Patent Office 3,028,181
Patented Apr. 3, 1962

3,028,181
SEALS FOR ROTATING SHAFTS
Lee Lavere Thompson and Ishmael W. Corder, both of P.O. Box 547, Iowa Park, Tex.
Filed Dec. 26, 1958, Ser. No. 783,013
2 Claims. (Cl. 277—12)

This invention relates to improvements in seals for rotating shafts and more particularly to seals to prevent leakage of fluid around rotating shafts, such as the shafts of centrifugal pumps, mixers and the like wherein the liquid within which the shaft rotates contains abrasives, thereby enabling the seals to be used over a long period of time and to perform satisfactorily even when they become worn.

Various seals and glands for pumps have been proposed heretofore, but these for the most part, relied on the tightness of packing material to prevent leakage of the hydraulic fluid around rotating shafts, such as pump shafts and the like.

The present invention provides a combination contact mechanical seal and fluid seal for a shaft, with the contact mechanical seal performing a sealing action only when the impeller of the fluid sealing element is static or nearly so, and with the fluid seal performing the primary sealing action, when the shaft and the fluid sealing impeller is rotating at the prescribed speed.

An object of this invention is to provide a seal for a rotating shaft of a hydraulic pump or the like, wherein the fluid surrounding the shaft, which fluid may contain abrasives or foreign particles, is prevented from moving along the shaft and passing into the bearings, the abrasive particles of which fluid would damage the bearings.

Another object of the invention is to provide a centrifugal pump with multiple impellers and multiple fluid housings, with the impellers being coaxial and spaced apart so as to define a fluid sealed chamber on the side of the pump impeller opposite the inlet of the pump.

Still another object of the invention is to provide, in combination with a centrifugal pump, a fluid seal therefor, the reservoir for which fluid is in fluid communication with said pump so as to automatically supply fluid to said fluid seal.

A further object of the invention is to provide for a pump, a fluid supply for sealing the shaft thereof so as to maintain the prime of the pump, and which fluid will hold pressure on the mechanical seal for the pump while operating at slow speed or when not operating.

Yet another object of the invention is to provide, for a centrifugal pump, a seal which is simple in construction, easy to assemble and disassemble, low in the cost of manufacture and easy and inexpensive to maintain.

Yet a further object of the invention is to provide a combination mechanical contact seal and fluid seal for sealing rotating shafts against the passage of fluid outward therethrough or the entrance of air thereinto, either while the shaft is rotating or is static.

With these objects in mind, and others which will become manifest as the description proceeds, reference is to be had to the accompanying drawings in which like reference characters designate like parts in the several views thereof in which:

FIG. 1 is a longitudinal, sectional view through the pump and seal therefor, with parts broken away and with parts shown in elevation to bring out the details of construction;

FIG. 2 is a sectional view taken on the line 2—2 of FIG. 1, looking in the direction indicated by the arrows;

FIG. 3 is a sectional view taken on the line 3—3 of FIG. 1, looking in the direction indicated by the arrows;

FIG. 3A is an enlarged, longitudinal sectional view through one of the contact mechanical sealing elements, shown apart from the device;

FIG. 4 is a fragmentary sectional view through a modified form of the combination mechanical and fluid seal; and FIG. 5 is a sectional view taken on the line 5—5 of FIG. 4, looking in the direction indicated by the arrows.

With more detailed reference to the drawing, the numeral 1 designates generally the pump housing, and the numeral 2 designates generally the fluid seal housing. The pump housing and the fluid seal housing are connected in end to end, coaxial relation by means of bolts 4 and 4. Other bolts 8 are spaced at circumferential intervals around the housings 1 and 2, so as to hold the component parts of the fluid seal together and to maintain the pump housing and fluid seal housing in fixed relation with respect to a base member 10. It is preferable to have the base member 10 of such construction as to have out-turned lugs 12 and a plate portion 14, which plate portion is apertured around the periphery to receive bolts 4 and 4, as will best be seen in FIGS. 1 and 2.

The plate 14 has an annular ring 16 positioned coaxial therewith, with a gasket 18 interposed therebetween, so as to form a fluid tight seal therewith. An impeller 20 is mounted on a shaft 22 within fluid seal housing 2. The shaft 22 extends outward through plate 14 and through a support plate 23, which support plate is spaced apart from plate 14 and has annular support members 26 interposed between plate 14 and support plate 24, with openings 28 therebetween to permit the escape of fluid, should any fluid pass out through opening 30 between shaft 22a and the plate 14, in which opening 30 is formed. Further fluid barriers 32 and 34 are fitted tightly around shaft 22a between plates 14 and 24, which prevent seepage of hydraulic fluid along the face of shaft 22, when the shaft is rotated slowly, or should the contact seal 36, within housing 2, become worn.

The shaft 22a extends outward from housing 2 and has a portion 22b thereof of larger diameter, so as to form shoulders 22c and 22d, against which shoulders the bearings 38 and 40 are positioned. A reduced portion of the shaft is indicated at 22e, on which reduced portion 22e a drive pulley may be secured, for driving the pump. A housing 42 surrounds the portion 22b of the shaft 22a, which housing is in communication with bearings 38 and 40, so the annular space therebetween may be filled with a lubricant, through lubricant fitting 44. Conventional seals 46 and 48 are provided exteriorly of bearings 38 and 40, which will retain the lubricant therein and which will normally prevent particles of foreign matter from entering into the lubricant chambers within the housing 42. A leg 10a extends downward from housing 42 so as to form a base which is complementary to base 10.

The housings 1 and 2 are separated by a common wall or plate 50, which plate 50 has an axial bore 52 formed therein for the passage of shaft 21 therethrough. The shaft 21 has an impeller 54 mounted thereon and secured thereto by cap screw 56, as will best be seen in FIGS. 1 and 2. A seal 58 is secured to shaft 21 and is rotatable therewith. This seal is of elastomer material with an arcuate curve, so that peripheral points are in contact with a wear plate 60, which wear plate is bonded or otherwise secured to a plate 62 which is secured to the wall 50 by screws 64. The seal 58 is of similar construction to the seal 36, and these seals 58 and 36 are so shaped that a multiplicity of tongues 66 are in contact relation with wear plate 60, when the impeller 54 is static. However, due to the mass of the outer portion of the curve of the tongues, these tongues 66 will become straightened, by centrifugal force, when the impeller 54 attains the correct pumping speed.

It is at the correct pumping speed that it is desirable to seal the pump against entrance of air around the shaft and to prevent the passage of hydraulic fluid outward through axial openings 30 and 52. Since the impellers 20 and 54 operate in unison and are secured to the shafts 22 and 21 in air tight relation, the fluid being pumped passes inward through inlet openings 68, through valve 70 and into the vortex 72 of the pump housing 1. The cut away portion of the respective impeller blades 54a which form the vortex 72, permits the hydraulic fluid to flow through the impeller blades, and with the impeller blades 54a arranged as shown in FIG. 2 and rotating in the direction indicated by the arrow in FIG. 2, the hydraulic fluid will be forced through outlet 74 of the pump housing 1 into a volume chamber 76, and with a check valve 70 to prevent the return of hydraulic fluid being pumped, the impeller 54 will be flooded at all times. However, to maintain circulation, a by-pass line 78 is provided between the lower portion of volume tank 76 and the vortex 72 of the housing 1.

The impeller blades 54a are positioned on one side of the disc of the impeller 54 and similar rib like blades 54b are provided on the opposite side of the disc of the impeller 54 and are positioned outwardly from seal 58, so as to throw the hydraulic fluid being pumped, outwardly as the impeller 54 is rotated, thereby preventing the hydraulic fluid from passing down behind the disc 54 and leaking outward through hole 52.

An annular ring 55 is mounted between wall or plate 50 and the plate 57, in which inlet 58 is formed. Gaskets 55a are provided on each end of an annular ring 55, so as to form a fluid tight seal between annular ring 55 and wall 50 on one end, and between the ring 55 and plate 57 on the opposite end.

The impeller 20, within housing 2 of the fluid seal, is somewhat similar in construction to impeller 54, inasmuch as ribs 20a are of similar curvature to ribs 54a and ribs 20b, are similar to ribs 54b and are of a similar curvature to ribs 54a. Ribs 20b are spaced away from the central portion of the disc-like plate 20c to receive elastomer contact sealing element 36, which is of similar construction to the sealing element 58. Wear plate 20d is bonded or otherwise secured to a plate 20e, which plate 20e is secured to plate 14 by screws 20f, as will best be seen in FIG. 1. Wear plates 20d and 60 are preferably of hardened or wear resisting material. However, provisions are made to replace these readily, as well as to replace the contact seals 36 and 58, should it become necessary to replace these parts.

The seal 36 is also of such mass, that upon the shaft 22 attaining the desired speed of rotation, the centrifugal force will sling the peripheral edges of sealing element 36 outward to be out of contact with the wear plate 20d. Therefore, wear on the plate 20d will occur only during the starting or stopping of the shaft 22 or during the slow rotation thereof.

A reservoir 80 is connected to the upper portion of housing 2 by means of a conduit 82 and is in position to hold clean hydraulic fluid, such as lubricating oil, soluble oil solution, or other liquid which is free of abrasive particles. The reservoir 80 has a vented cover 84 thereon, which cover is positioned at a point above the maximum liquid level. The conduit 82 is of such size as to permit the flow of hydraulic fluid from the reservoir 80 into the housing 2, when the impeller 20 is not running, and which reservoir 80 is of a capacity to fill housing 2. However, upon rotating the impellers 20 and 54, in the direction as indicated by the arrow in FIG. 2, a portion of the hydraulic fluid is forced from housing 2 upward through pipe 82 into reservoir 80. However, the centrifugal speed of the impeller 20 will cause an annular ring F of sealing fluid to be formed around the inner diameter of the housing 2 in a manner substantially as indicated by the dashed outline in FIG. 1, and impeller 54 will also form a peripheral ring of fluid being pumped, which fluid will pass upward through outlet 74 into volume tank 76 and be discharged out through discharge pipe 77.

However, since the pressure within the chamber of housing 2 and that within the chamber of housing 1 will be substantially equal, and since the impeller blades 54a and 54b are directing the hydraulic fluid being pumped outward, and the impeller blades 20a and 20b in the chamber of housing 2 are likewise directing the fluid outward, the suction and pressure on axial passage 52 will be substantially equalized. Therefore, no fluid will flow in either direction so long as the pump is running at its rated speed. However, in this particular condition, the fingers 66 of the contact seal 58 and the similar fingers of contact seal 36 are thrown outward out of engagement with wear plates 60 and 20a, respectively, and since a ring of fluid, as indicated at F, surrounds the inner diameter of housing 2, air cannot pass from axial opening 30 through the peripheral ring of fluid F into the housing 1 when the pump is running at its rated speed. Therefore, the seal presented by the ring of fluid F, within housing 2, will prevent passage of air into pump housing 1 and likewise the equality of pressures will prevent the passage of hydraulic fluid through axial opening 52, even though the axial opening has several thousandths of an inch clearance between the shaft and the axial bore 52 of the wall 50.

Therefore, the only time the contact seals 58 and 36 come into use, is at speeds below that of which the impellers will throw the fluid outward in the respective housings 1 and 2, and when the impellers are stopped. Should any abrasive fluid pass through opening 52 into housing 2, it would likewise be deterred from passing out through opening 30, except when the impellers are slowing or they are stopped, but should it pass outward, it could not get into bearings 38 and 40, due to the open space 27 between plates 14 and 24. Therefore, the life of the pump will be determined by the wearing qualities of the impellers 20 and 54 and the material of the housings 2 and 1, and not by the lasting qualities of the bearings 38 and 40, which in most applications heretofore, were subject to wear by the abrasive particles of the polluted fluid being pumped.

The seal 34 is of a character similar to seals 36 and 58, except it is preferable to have the peripheral edge thereof intermittently weighted with slugs or balls 35, so as to cause the edge thereof to be thrown outward by centrifugal force, to prevent wear on the contact face of the seal.

The operating conditions, as described above, exist both when the pump is being run in a horizontal position, as shown in FIG. 1, or when the pump is in a vertical position, however, when the pump is in a vertical position with the outlet 68 at the lower end, the volume tank 76 and the fluid reservoir 80 are maintained in the same position relative to the horizon, as shown in FIG. 1, which is readily accomplished by an L-fitting in conduit 74 intermediate the pump and the fluid reservoir, as is well understood in the art of fittings. Furthermore, conduits 78 and 82 may be flexible hose and of sufficient length to permit the fluid reservoir 80 to be moved through 90 degrees, or conventional fittings may be used on the conduits 78 and 82 to make these conduits the proper length and shape to connect with volume tank 76 and fluid reservoir 80, when the volume tank 76 and fluid reservoir 80 are so modified. With the volume tank 76 and fluid reservoir 80 so arranged in an elevated position above housing 2, the impeller 20 is initially flooded, while the impellers 20 and 54 are not running, however, upon starting rotation of impellers 20 and 54, the centrifugal speed thereof will cause an annular ring of sealing fluid to be formed in housing 2.

The impeller blades 20a of impeller 20, have cut-away portions 20g, which forms a recess for the reception of an annular ring 51, which is integral with the plate 50 and projects outward into housing 2 between the inner ends of impeller blades 20a of impeller 20. A hub 20h extends outward from plate 20c of impeller 20, which is telescoped into ring 51, as will best be seen in FIG. 1.

When the pump is in vertical position, that is with the shaft 22 extending upward and carries impellers 20 and 54 thereon, the upstanding annular ring 51 will prevent fluid that is outward from the ring 51 from passing out of the chamber of housing 2, below the top of ring 51, into the chamber of housing 1 even though there is considerable clearance between the hole or bore 52 and the shaft 22. The fluid retained by the annular ring 51 within housing 2, will be thrown outward to form an annular sealing ring of fluid F, as indicated in dashed outline in FIG. 1, which seal forms a leak proof barrier against the passage of mud outward through holes 52 and 30 to the exterior of housing 2, or the passage of air through holes 30 or 52 inward into the chamber of pump housing 1.

The fluid forming the annular seal, as indicated at F, is determined by the radially inward spacing of conduit 82 on plate 14, as all the fluid will be expelled from the housing 2 except the ring of fluid that is peripheral with respect to the radius of the outlet of conduit 82. In this manner it will be seen that the pump may be run either in a horizontal position or in a vertical position, with the fluid seal performing with the same degree of efficiency. The fluid forming the annular seal F extends inward sufficiently to embrace the periphery of impeller disc 20c, thereby preventing leakage through axial bore 30 in plate 14, and since the pressures in the chambers of the respective housings 1 and 2 are substantially equal no leakage will occur between these chambers.

Operation

When it is desired to operate the pump 1, the pump chamber is filled with liquid until the impeller 54a is submerged and with the check valve 70 closed, the liquid will be retained within the pump chamber, as the seal 58 is in contact with wear plate 60, and then liquid is poured into reservoir 80 by removing fill cap 84 until impeller 20 is submerged in liquid, whereupon, the shaft, designated at 22, is rotated by a suitable source of power. The seal 36 of the fluid seal device in housing 2 will seal against wear plates 20e to prevent loss of liquid until the shaft is rotated at sufficient speed to prevent loss of liquid through axial opening 30 in plate 14. However, as the speed of the shaft increases, the seals 36 and 58 will swing out of engagement with wear plates 20e and 60, and the fluid within fluid seal housing 2 will be forced up conduit 82 to partially fill reservoir 80. However, an annular rim of fluid F will be forced radially outward from the outlet opening of conduit 82, as indicated in FIG. 1, to encircle the inner diameter of housing 2. This fluid will seal the sides and ends of impeller 20 to prevent air from being sucked into housing 1 through axial opening 52.

Since the suction within housing 2 approximates the suction in housing 1, the flow between the chambers of housings 1 and 2 will be nullified. However, the impeller 54a within housing 1 will draw liquid being pumped up through inlet pipe 68 through check valve 70, to be discharged upward through outlet pipe 74 into volume tank 76, which tank 76 also forms a reservoir for fluid, so as to always maintain the impeller 54a in a flooded condition. A by-pass pipe 78 is provided to extend from the lower edge of reservoir 76 to a point near the inlet in housing 1. A valve 79 is provided within this by-pass pipe 78, so the entire flow may be closed off, or regulated as desired. By having this by-pass within the pump system, liquid will be continuously circulated within the pump housing 1, in event the inlet pipe 60 should be come clogged, or should withdraw all of the liquid from the source of liquid being pumped. This arrangement with keep the impeller and seal 58 in cooled condition and will also prevent the passage of air through axial opening from the chamber of one of the housings to the chamber of the other of the housings. When the shaft 22 ceases to rotate, the chambers of the respective housings 1 and 2 are filled by the respective pipes 78 and 82, so as to maintain a static condition, which will prevent liquid in one of the chambers from passing into the other of the chambers, as the hydrostatic head is substantially equal

Modified Form of Invention

The modified form of the invention, as disclosed in FIGS. 4 and 5, utilizes a combination mechanical seal and fluid seal to seal a rotating shaft within a vessel other than a pump housing, and is so arranged that the mechanical contact seal will prevent leakage while the shaft is not rotating, or while it is rotating at slow speeds. However, after the shaft attains a speed sufficient for the fluid seal to function, the mechanical seal is so constructed as to be out of contact with the wearing surface, so a minimum of wear will be accorded the contact mechanical seal.

The numeral 100 designates the wall of a reservoir or other vessel containing fluid. A rotating shaft 101 passes through the wall of the reservoir or vessel 100, and a removable seal housing, which is designated generally at 102, is bolted to the wall 100 by means of bolts 104. The seal housing 102 is apertured at 106 for the passage of shaft 101 therethrough. The shaft 101 may have a mixer element, or any desired rotating member secured thereto within the vessel 100, which shaft is supported on bearings (not shown) so as to maintain the shaft in alignment with the aperture 106. The shaft 101 is shouldered at 108, and a contact mechanical seal 34 is fitted thereagainst. The mechanical seal 34 has a metal ring 33 which fits snugly on shaft 101 in fluid tight relation. The seal 34 is of an elastomer, such as synthetic rubber, rubber, or the like, and is cupped in shape, as best seen in FIG. 4, and has a beaded rim 36 around the periphery thereof, into which beaded rim slugs, such as lead pellets 35, are positioned, so as to increase the weight of the rim, so when rotating at a predetermined speed, the rim will tend to move away from the contact surface 110 of seal housing 102, due to the action of the centrifugal force.

A circular disc 112, which has a hub 114 thereon and which hub is apertured to fit on shaft 101, is held in place by a nut 116 screwthreaded to the shaft and in bearing relation against hub 114, so as to hold the disc 112 against longitudinal movement relative to the shaft 101. The shaft 101 has a key-way formed therein to receive a key 118, which key complementally engages a key-way in hub 114, so as to secure the shaft in fixed relation with respect to disc 112. The face of the disc 112, adjacent the wear surface 110, has outwardly extending ribs 120 thereon, which ribs are spirally arranged, so when rotated in one direction, they will urge liquid outward from the center thereof. The ribs 120 have their inner ends spaced outward from the center a sufficient distance to receive contact mechanical seal 34, when the seal is fully extended by centrifugal force.

The fluid seal housing 102 has an annular rim 122 there-around which is angularly diverging with respect to shaft 101, and which annular rim surrounds the periphery of disc 112. When the disc 112, having upstanding ribs 120 thereon, is positioned within angularly diverging rim 122, there is a very slight clearance between the top of the blades and the face of the housing in which the device operates.

The angular divergence of the rim 122 with respect to shaft 101 is such that fluid escaping outward from the periphery of the disc member 112 will be diverted inward toward the center of the vessel at an acute angle. This will cause the fluid to be expelled at such an angle that it will not readily re-enter the space between the disc 112 of the impeller and the inner face 110 of the impeller housing 102, until the impeller slows to a slow speed or stops. It will be noted, FIG. 4, that with the contact mechanical sealing element 34 in contact with the wear surface 110, no fluid can pass outward through aperture 106 in fluid seal housing 102. However, as the shaft 101 rotates, in the direction indicated by the arrow in FIG. 5, the fluid between disc 112 and the wall of the housing 102 will be thrown outward, and as long as shaft 101 is rotating, fluid will be maintained out of the portion of the housing between disc 112 and the complementary portion 102 of the housing.

It is to be pointed out that this particular arrangement is readily applicable to many uses where "stuffing boxes" are inapplicable, because of the abrasive content in the fluid which causes the packing members of the stuffing boxes to disintegrate, whereas, in the present combination of contact mechanical seal and fluid seal, very little wear on the contact mechanical seal and the complementary wear plate occurs during the starting and stopping of the device, and none during the running thereof.

Having thus fully shown and described the invention what is claimed as new and desired to secure by Letters patent is:

1. A seal for a rotating shaft comprising, a closed housing, said housing including a cylindrical wall and first and second end plates secured to said cylindrical wall, an aperture formed in each end plate, a rotatable shaft mounted within the housing and extending through said apertures, the longitudinal axis of the shaft being coincident with the longitudinal axis of the cylindrical housing, a first cup-shaped, elastomer seal secured to said shaft within the housing and having its concave portion facing the first end plate, said elastomer seal being in fluid-tight relation and rotatable with the shaft, the elastomer seal having a peripheral edge of a relatively heavy mass engaging the first end plate when the shaft is static, thereby forming a seal between the shaft and the first end plate, a second cup-shaped, elastomer seal secured to the shaft exteriorly of the housing and having its concave portion facing the second end plate, said elastomer seal being in fluid-tight relation and rotatable with the shaft, the second elastomer seal having a peripheral edge of a relatively heavy mass engaging the second end plate when the shaft is static, thereby forming a seal between the second end plate and the shaft; the first end plate having at least one opening formed therein between the aperture and the wall of the housing, a conduit in communication with said opening and connected to a liquid reservoir to facilitate the flow of liquid through the opening to thereby fill the cylindrical housing with said liquid, an impeller disc mounted on the shaft within the cylindrical housing, said impeller disc being in close fitting relation with the shaft to prevent leakage of the liquid therebetween, said disc having impeller blades extending outwardly into close proximity to the wall of the cylindrical housing, the peripheral edges of the first and second elastomer seals adapted to move out of engagement with the first and second end plates, respectively, by centrifugal force, when the shaft is rotated at a predetermined speed, thereby eliminating friction between the peripheral edges of the elastomer seals and the end plates; portion of the liquid within the housing being expelled through the opening and into the reservoir, and the remaining portion of the liquid within the housing being forced radially outwardly, thereby forming an annular liquid seal between the impeller disc and the cylindrical housing wall when the shaft is rotated at said predetermined speed, thereby preventing leakage of fluid through the second apertured end plate of the cylindrical housing.

2. A seal for a rotating shaft comprising, a closed housing, said housing including a cylindrical wall and first and second apertured end plates, a rotatable shaft mounted within the housing and extending through the apertures formed in the end plates, the longitudinal axis of the shaft being coincident with the longitudinal axis of the cylindrical housing, a first wear plate detachably secured to the first apertured end plate within the housing and surrounding the shaft, a first cup-shaped, elastomer seal secured to said shaft within the housing and having its concave portion facing the first wear plate, said elastomer seal being in fluid-tight relation and rotatable with the shaft, the elastomer seal having a peripheral edge of a relatively heavy mass engaging the first wear plate when the shaft is static, thereby forming a seal between the shaft and the first wear plate, a second wear plate detachably secured to the second apertured end plate exteriorly of the housing and surrounding the shaft, a second cup-shaped elastomer seal secured to the shaft exteriorly of the housing and having its concave portion facing the second wear plate, said second elastomer seal being in fluid-tight relation and rotatable with the shaft, the second elastomer seal having a peripheral edge of a relatively heavy mass engaging the second wear plate when the shaft is static, thereby forming a seal between the second wear plate and the shaft; the first end plate of the cylindrical housing having at least one opening formed therein between the aperture and the wall of the housing, a conduit in communication with said opening and connected to a liquid reservoir to facilitate the flow of liquid through the opening to thereby fill the cylindrical housing with said liquid, an impeller disc mounted on the shaft within the cylindrical housing, said impeller disc being in close fitting relation with the shaft to prevent leakage of the liquid therebetween, said disc having spiral blades disposed on each face thereof, said blades extending outwardly into close proximity to the wall of the cylindrical housing; the peripheral edges of the first and second elastomer seals adapted to move out of engagement with the first and second wear plates, respectively, by centrifugal force, when the shaft is rotated at a predetermined speed, thereby eliminating friction between the peripheral edges of the elastomer seals and the wear plates; a portion of the liquid within the housing being expelled through the opening and into the reservoir, and the remaining portion of the liquid within the housing being forced radially outwardly, thereby forming an annular liquid seal between the impeller disc and the cylindrical housing wall when the shaft is rotated at said predetermined speed, thereby preventing leakage of fluid through the second apertured end plate of the cylindrical housing.

References Cited in the file of this patent

UNITED STATES PATENTS

| | | |
|---|---|---|
| 2,127,865 | Goddard | Aug. 23, 1938 |
| 2,140,356 | Gutmann | Dec. 13, 1939 |
| 2,258,527 | Warman | Oct. 7, 1941 |
| 2,418,707 | Groot | Apr. 8, 1947 |
| 2,427,656 | Blom | Sept. 23, 1947 |
| 2,478,649 | Wightman | Aug. 9, 1949 |
| 2,622,902 | Malmvik | Dec. 23, 1952 |
| 2,646,999 | Barske | July 28, 1953 |
| 2,787,960 | Wightman | Apr. 9, 1957 |
| 2,875,696 | Zborowski | Mar. 3, 1959 |
| 2,936,715 | Southam et al. | May 17, 1960 |